United States Patent
Sun

(10) Patent No.: US 8,463,124 B2
(45) Date of Patent: Jun. 11, 2013

(54) PASSIVE OPTICAL NETWORK WITH SUB-OCTAVE TRANSMISSION

(75) Inventor: Chen-Kuo Sun, Escondido, CA (US)

(73) Assignee: Titan Photonics, Inc., Fremont, CA (US)

( * ) Notice: Subject to any disclaimer, the term of this patent is extended or adjusted under 35 U.S.C. 154(b) by 294 days.

(21) Appl. No.: 12/980,008

(22) Filed: Dec. 28, 2010

(65) Prior Publication Data

US 2012/0163816 A1 Jun. 28, 2012

(51) Int. Cl.
*H04B 10/20* (2006.01)
(52) U.S. Cl.
USPC .................................. 398/63; 398/58; 398/70
(58) Field of Classification Search
USPC ...................... 398/58–74, 115–116
See application file for complete search history.

(56) References Cited

U.S. PATENT DOCUMENTS

| | | | |
|---|---|---|---|
| 5,153,763 A | 10/1992 | Pidgeon | |
| 5,379,141 A * | 1/1995 | Thompson et al. | 398/91 |
| 6,118,131 A | 9/2000 | Korevaar | |
| 6,141,128 A | 10/2000 | Korevaar et al. | |
| 6,493,485 B1 | 12/2002 | Korevaar | |
| 6,538,789 B2 | 3/2003 | Sun | |
| 6,581,081 B1 | 6/2003 | Messerly et al. | |
| 6,928,248 B2 | 8/2005 | Achour et al. | |
| 7,088,921 B1 | 8/2006 | Wood | |
| 2002/0093710 A1* | 7/2002 | Birk et al. | 359/125 |
| 2004/0213573 A1* | 10/2004 | Schemmann et al. | 398/66 |
| 2006/0165413 A1 | 7/2006 | Schemmann et al. | |
| 2007/0195901 A1* | 8/2007 | Geile et al. | 375/260 |
| 2007/0206693 A1 | 9/2007 | Geile et al. | |
| 2010/0329680 A1* | 12/2010 | Presi et al. | 398/79 |

* cited by examiner

*Primary Examiner* — Dzung Tran
(74) *Attorney, Agent, or Firm* — Nydegger and Associates

(57) ABSTRACT

A passive optical network for transmitting digital signals incorporates sub-octave filters for the removal of distortions introduced into the signals as they are transmitted over the fiber optic cable of the network. Stated differently, second order distortions that result when the light beam carrying the digital signals is passed through a fiber optic cable are removed by the sub-octave filter. Further, the employment of another passive optical network on the same fiber optic cable with the present network is provided for. And, considerations for ensuring the compatibility of upstream and downstream transmission frequencies with the sub-octave filters are disclosed.

16 Claims, 2 Drawing Sheets

PASSIVE OPTICAL NETWORK WITH SUB-OCTAVE TRANSMISSION

FIELD OF THE INVENTION

The present invention pertains generally to systems and methods that enable transmissions of data over optical fibers. More particularly, the present invention pertains to systems and methods for transmitting digital signals over fiber optic networks with subsequent sub-octave filtering to remove second order distortions from the signals. The present invention is particularly, but not exclusively, useful as a system and method for using a Passive Optical Network (PON) to transmit digital signals with subsequent sub-octave filtering.

BACKGROUND OF THE INVENTION

A Passive Optical Network (PON) is essentially an optical network that uses a single fiber optic cable for the transmission of signals from one point (e.g. a service provider) to a plurality of different points (e.g. customer premises). Most likely, the signals to be transmitted will be digital signals. Therefore, in addition to the fiber optic cable, the PON will necessarily include a component (i.e. modem) at the transmit end of the fiber optic cable that modulates digital signals onto a radio frequency (RF) carrier wave. The resulting RF signal is then converted into an optical signal for transmission over the fiber optic cable. At the receive end of the fiber optic cable, the process is reversed. Specifically, a component (modem) reconverts the optical signal to an RF signal, and then demodulates the RF signal for subsequent use.

An important aspect of a PON is that it can take advantage of the well known transmission of optical signals by Wavelength-Division Multiplexing (WDM). This essentially allows the PON to use one wavelength ($\lambda_1$) for downstream traffic on the fiber optic cable, while simultaneously using another wavelength ($\lambda_2$) for upstream traffic. Further, it is possible to have two or more upstream traffic wavelengths (e.g. $\lambda_1$ and $\lambda_3$), and two or more downstream traffic wavelengths (e.g. $\lambda_2$ and $\lambda_4$). This WDM capability, coupled with the point-to-multipoint characteristics of the PON, gives it a distinct advantage over other types of network architectures. Specifically, a PON configuration will reduce the amount of fiber optic cable that is required vis-à-vis a point to point architecture. A potential downside, however, is that fiber optic cables are known to introduce distortions into an optical signal that diminish its clarity.

Of all the distortions that may be introduced into an optical signal as it transits through a fiber optic cable, the most predominant distortion is the second order distortion. These second order distortions, however, are relatively easily identified. For example, consider an optical signal carrying RF frequencies $f_a$ and $f_b$. It can happen that the fiber optic cable will induce two RF distortion signals at frequencies $f_a+f_b$ and $f_a-f_b$ into the optical signal as it transits through the fiber optic cable. In the case where $f_a \cong f_b$, the second order distortions are $f_a+f_b \cong 2f_a$ and $f_a-f_b \cong 0$. In this case, $f_a-f_b \cong 0$ is trivial and $2f_a$ defines the octave for $f_a$.

In light of the above, an object of the present invention is to provide a passive optical network with a sub-octave filter that will transmit clear signals over the PON with minimal, if any, distortions at the receive end of the transmission. Another object of the present invention is to provide a passive optical network that effectively removes distortions from a transmitted signal that are induced into the signal by the fiber optic cable of the PON. Still another object of the present invention is to provide a passive optical network with a sub-octave filter for removing second order distortions from transmitted optical signals that is easy to use, is simple to employ and is comparatively cost effective.

SUMMARY OF THE INVENTION

In accordance with the present invention, a Passive Optical Network (PON) incorporates a band pass filter for removing second order distortions from an optical signal that are induced when a light beam is transmitted through a fiber optic cable in the PON. In accordance with the present invention, the optical signal from the fiber optic cable is converted to an RF signal, and the RF signal is filtered in the sub-octave bandwidth that includes the RF carrier frequency of the digital signal. The RF signal can then be demodulated for subsequent reception of the digital signal.

Structurally, the Passive Optical Network (PON) of the present invention includes a transmit modem for modulating a plurality of digital signals onto respective RF carrier frequencies (f). This can be done by either amplitude modulation, frequency modulation, or phase modulation. An optical transmitter with the modem is also used to convert each of these modulated carrier frequencies into an optical signal. A Wavelength-Division Multiplexer (WDM) is then used to combine the optical signal with other, similarly formed optical signals to create a light beam. Importantly, in the light beam each optical signal will have its own separate wavelength ($\lambda$).

For the present invention, an optical fiber cable is provided for transmitting the light beam over the PON between an Optical Line Terminal (OLT) [e.g. a service provider] and a plurality of Optical Network Units (ONU) [e.g. customers]. In detail, the optical fiber will have a first end that is connected to the OLT for receiving the light beam from the transmitter and the WDM. The light beam is then transferred through the optical fiber to its second end. A splitter, which is connected to the second end of the optical fiber, is used for splitting the light beam into subsets. As envisioned for the present invention, each subset will be sent to a respective ONU, and it will include all of the optical signals in the transmitted light beam, albeit at reduced power.

A plurality of optical receivers are positioned at respective customers (i.e. ONUs) in the network to receive a subset from the light beam. Each optical receiver then functions with a modem to reconvert optical signals in the subset back to their respective modulated carrier frequencies. A sub-octave band pass filter then filters out the second order distortions that are outside the sub-octave of the modulated carrier frequency. Thus, second order distortions are removed from the received signals.

Once the received signals have been reconverted and filtered, a tuner is used to tune in a selected carrier frequency and to direct the selected carrier frequency to an addressed premise in the ONU. The receive modem then demodulates the tuned carrier frequency to reconstruct its respective digital signal. The digital signal can then be used for its intended purpose.

Operationally, a method of the present invention for enabling a sub-octave transmission of a digital signal over a passive optical network (PON) relies on establishing a sub-octave bandwidth for each of a plurality of discrete carrier frequencies (f). Initially, the method envisions modulating a digital signal onto a selected carrier frequency (f) and then converting the modulated carrier frequency into an optical signal. With this conversion, the optical signal and the digital signal will both have a same wavelength ($\lambda$). Several such optical signals can be correspondingly formed and combined together into the light beam. In the event, the light beam is introduced into the first end of a fiber optic cable and is transmitted through the fiber optic cable from the first end to a second end.

At the second end of the fiber optic cable, the light beam is split into subsets that each include all of the optical signals of the originally transmitted beam. Each subset of the light beam is then directed to a designated optical receiver at a respective ONU where it is reconverted to the modulated carrier frequency. At this point, the second order distortions that are outside the established sub-octave are filtered from the modulated carrier frequency. A tuner can then be used to tune in a selected modulated carrier frequency, and a receive modem can be used to demodulate the tuned carrier frequency for receipt of its respective digital signal.

As envisioned for the present invention, establishing the sub-octave involves identifying a first octave bounded by a low carrier frequency MO and a high carrier frequency ($f_{H1}$). This first octave will be used by a forward (downstream) transmit light beam. Importantly, $2f_{L1} \geq f_{H1} > f_{L1}$. Also, a second octave is identified which is bounded by a low carrier frequency ($f_{L2}$) and a high carrier frequency ($f_{H2}$). This second octave will be used by a return (upstream) receive light beam, wherein $2f_{L2} \geq f_{H2} > f_{L2}$. For the present invention, the forward (downstream) transmit light beam and the return (upstream) receive light beam will include carrier frequencies in a range between 750 MHz and 40 GHz. Further, it is contemplated that embodiments of the present invention may employ two PONs on the same optical fiber cable. For these embodiments, the present invention envisions adding bandwidth below $f_L$ for use by a forward (downstream) transmit light beam (e.g. $\lambda_3$) in the second PON, and bandwidth below $f_{L2}$ for use by a return (upstream) receive light beam (e.g. $\lambda_4$) in the second PON.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
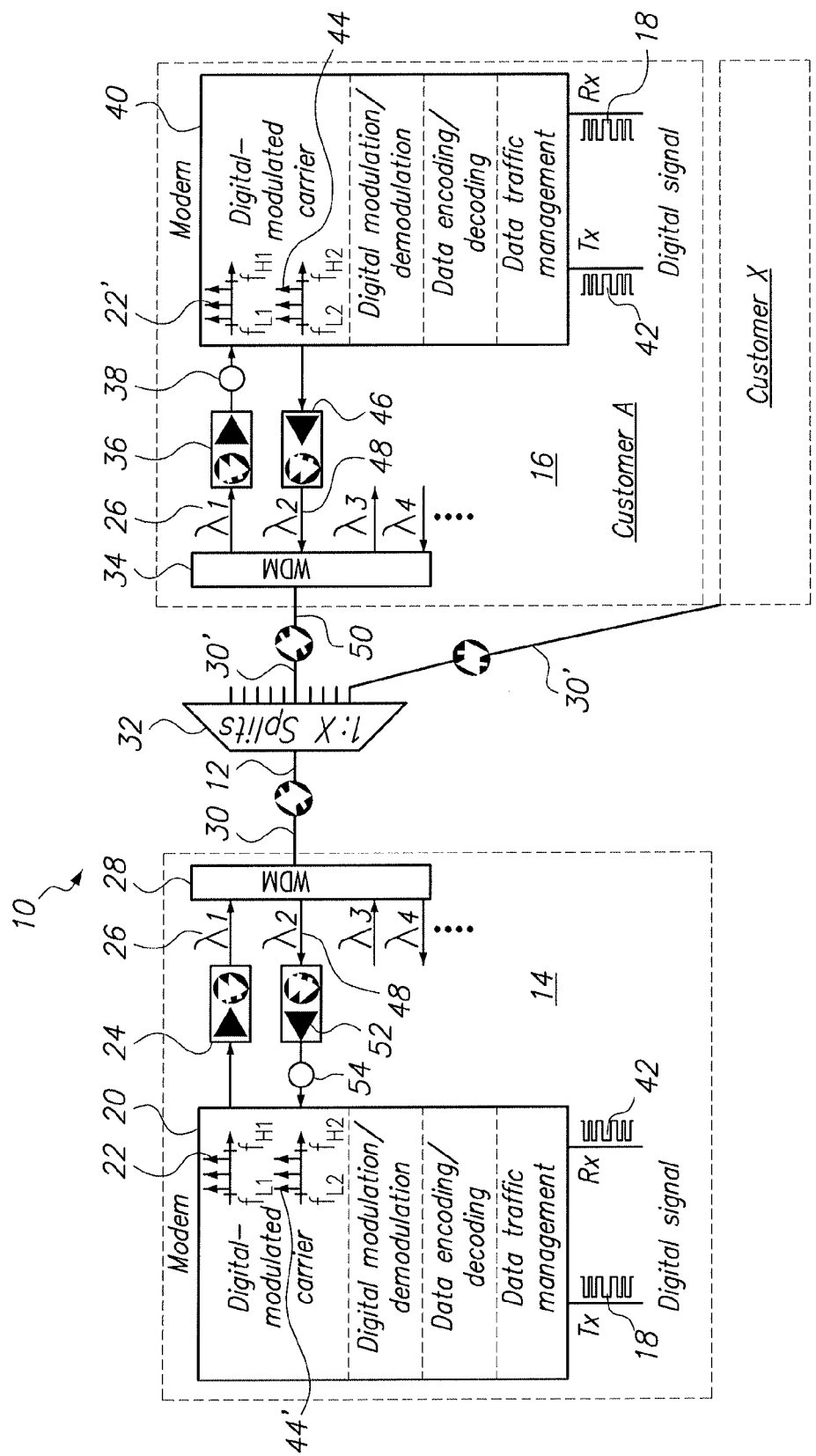
FIG. 1 is a schematic layout of the component elements of a Passive Optical Network (PON) in accordance with the present invention.

Referring initially to FIG. 1, component elements of a Passive Optical Network (PON) in accordance with the present invention are shown collectively and generally designated 10. As shown, the PON 10 includes a fiber optic cable (optical fiber) 12 that interconnects an Optical Line Terminal (OLT) 14 (e.g. a service provider) with a plurality of Optical Network Units (ONU) 16 (e.g. customers). In FIG. 1, the ONU 16 is only exemplary, and is shown to be servicing Customer A.

As indicated in FIG. 1, a digital signal 18 that is to be transmitted over the PON 10 is modulated by the modem 20. For purposes of the PON 10, this modulation may be either an amplitude modulation, a frequency modulation, phase modulation, or any combination of the three. In any event, the digital signal 18 is modulated onto an RF carrier frequency ($f_1$) in a manner well known in the pertinent art. In FIG. 1, it is shown that the modulated carrier frequency 22 (i.e. $f_1$) is established in a sub-octave that is bounded by a low carrier frequency $f_{L1}$ and a high carrier frequency $f_{H1}$. Once the sub-octave is established, the now-modulated carrier frequency 22 is passed to a transmitter 24 where it is converted into an optical signal 26 (i.e. an optical signal with wavelength $\lambda_1$). In turn, the optical signal 26 ($\lambda_1$) is sent to a Wavelength-Division Multiplexer 28 (WDM) where it is combined with other optical signals (e.g. $\lambda_3$) into a light beam 30 for downstream transmission over the fiber optic cable 12. As shown in FIG. 1, the fiber optic cable 12 is connected between the WDM 28 and a splitter 32.

After the optical signal 26 on light beam 30 has been transmitted over the fiber optic cable 12, the light beam 30 is split at the splitter 32 into a plurality of subset light beams 30'. Importantly, each subset light beam 30' includes all of the optical signals (e.g. $\lambda_1$ and $\lambda_2$) that were combined together at the WDM 28. Further each subset light beam 30' is then sent to a respective ONU 16. Operationally, the WDM 34 at ONU 16 (i.e. Customer A) receives the same subset light beam 30' as does every other ONU 16 in the PON 10 (e.g. Customer X). For the specific example of customer A, the optical signal ($\lambda_1$) 26 that is in the subset light beam 30' received by ONU 16, is sent to a receiver 36 where it is reconverted into its modulated carrier frequency 22' (i.e. $f_1$). This modulated carrier frequency 22' ($f_1$) is then filtered by a band pass filter 38 and is demodulated by the modem 40. The consequence of this is that the digital signal 18 that is being carried by a filtered carrier frequency 22' is received at the ONU 16 with all impairments caused by second order distortions effectively removed from the digital signal 18.

Although the above disclosure has focused on a downstream transmission from OLT 14 to ONU 16, an upstream transmission from ONU 16 to the OLT 14 is similar and essentially operates in reverse. Specifically, for an upstream transmission, a digital signal 42 is modulated at the modem 40 onto an RF carrier frequency ($f_2$) in a manner as similarly disclosed above for $f_1$. In this instance, a modulated carrier frequency 44 (i.e. $f_2$) is established in a sub-octave that is bounded by a low carrier frequency $f_{L2}$ and a high carrier frequency $f_{H2}$. The modulated carrier frequency 44 is then passed to a transmitter 46 where it is converted into an optical signal 48 (i.e. an optical signal with wavelength $\lambda_2$). In turn, the optical signal 48 ($\lambda_2$) is sent to the Wavelength-Division Multiplexer 34 (WDM) where it can be combined with other optical signals (e.g. $\lambda_4$) into a light beam 50 for an upstream transmission over the fiber optic cable 12. The light beam 50 is then received by OLT 14, processed through the Wavelength-Division Multiplexer 28 and sent to a receiver 52 where the optical signal 48 in the light beam 50 is reconverted into its modulated carrier frequency 44' (i.e. $f_2$). This modulated carrier frequency 44 ($f_2$) is then filtered by a band pass filter 54, and it is subsequently demodulated by the modem 20. The consequence of this is that the digital signal 42 is received at the OLT 14 with all impairments caused by second order distortions being effectively removed from the digital signal 42.

Figure 2:
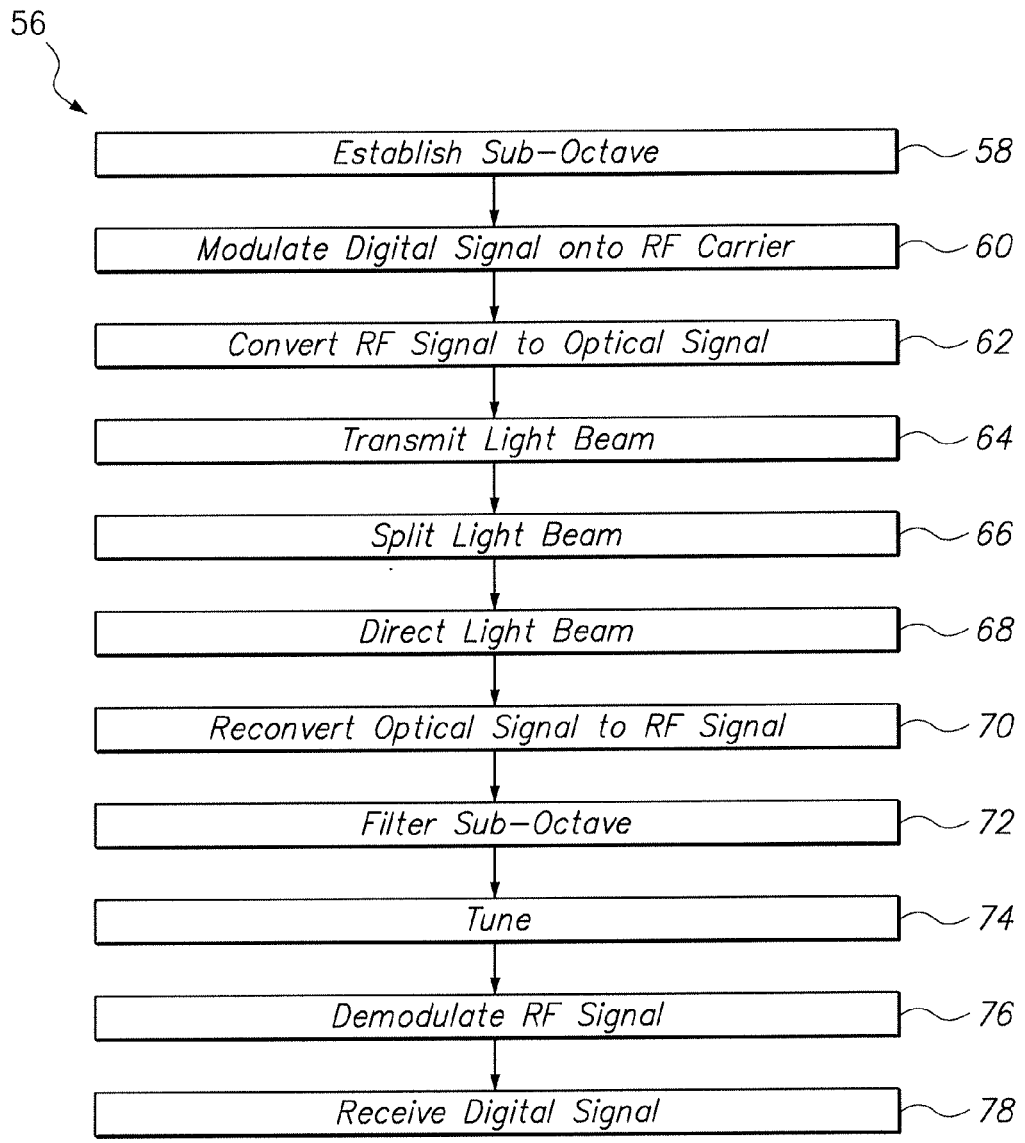
FIG. 2 is an operational flow chart of the methodology of the present invention.

FIG. 2 presents a step-by-step methodology, generally designated 56, which indicates that an initial consideration for an operation of the PON 10 is the establishment of a sub-octave (see block 58). Specifically, a sub-octave is established for each transmission (downstream/upstream). To transmit a digital signal 18/42 over the PON 10, block 60 indicates that the digital signal 18/42 is modulated onto a carrier frequency 22 ($f_1$)/44 ($f_2$). Block 62 then indicates that the modulated carrier frequency 22 ($f_1$)/44 ($f_2$) is converted to an optical signal 26 ($\lambda_1$)/48 ($\lambda_2$). The optical signal 26 ($\lambda_2$)/48 ($\lambda_2$) can then be combined with other such signals at a WDM 28/34 and transmitted (downstream/upstream), as a light beam 30/50 over the fiber optic cable 12 (see block 64).

Insofar as the light beam 30 is specifically concerned, block 66 indicates that the light beam 30 is split into subset light beams 30'. Each subset light beam 30' is then directed to a particular ONU 16 (see block 68) where it is converted back (see block 70) from an optical signal 26 ($\lambda_1$)/48 ($\lambda_2$) to an RF modulated carrier frequency 22 ($f_1$)/44 ($f_2$). The RF modulated carrier frequency 22 ($f_1$)/44 ($f_2$) is then filtered (see block 72). More specifically, as indicated above, a unique sub-octave is established for use by each of the band pass filters 38 and 54 to respectively remove second order distortions from the downstream light beam 30 and from the upstream light beam 50, after the light beams 30/50 have been transmitted through the fiber optic cable 12.

After the optical signals 26 ($\lambda_1$)/48 ($\lambda_2$) have been reconverted to respective RF modulated carrier frequencies 22' ($f_1$)/44' ($f_2$), and the second order distortions have been removed from the RF modulated carrier frequencies 22' ($f_1$)/44' ($f_2$), block 74 indicates a user can tune for a carrier frequency of interest (e.g. modulated carrier frequency 22 ($f_1$)). The modulated carrier frequency 22 ($f_1$) is then demodulated by a modem 20/40 (see block 76) and the digital signal 18/42 is received for use without any appreciable impairments caused by second order distortions in the transmission process (see block 78).

While the particular Passive Optical Network with Sub-Octave Transmission as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for enabling a sub-octave transmission of a digital signal over a passive optical network (PON) which comprises the steps of:
    establishing sub-octave bandwidths having a respective plurality of discrete carrier frequencies (f), wherein a first octave is bounded by a low carrier frequency ($f_{L1}$) and a high carrier frequency ($f_{H1}$) for use by a forward transmit light beam, wherein $2f_{L1} \geq f_{H1} > f_{L1}$, and a second octave is bounded by a low carrier frequency ($f_{L2}$) and a high carrier frequency ($f_{H2}$), for use by a return receive light beam, wherein $2f_{L2} \geq f_{H2} > f_{L2}$;
    modulating a plurality of digital signals onto a respective carrier frequency;
    converting the digital signals to create a plurality of optical signals;
    combining the plurality of optical signals to create a light beam wherein the light beam has a wavelength ($\lambda$);
    introducing the light beam into a first end of a fiber optic cable for transmission through the fiber optic cable from the first end to a second end thereof;
    retrieving the light beam from the second end of the fiber optic cable;
    splitting the light beam into subsets;
    directing each subset of the light beam to a designated optical receiver;
    reconverting the light beam to the modulated carrier frequency;
    filtering second order distortions outside the sub-octave from the modulated carrier frequency;
    tuning a selected modulated carrier frequency; and
    demodulating the tuned carrier frequency for receipt of its respective digital signal.

2. A method as recited in claim 1 wherein the forward transmit light beam and the return receive light beam include carrier frequencies in a range between 750 MHz and 40 GHz.

3. A method as recited in claim 2 further comprising the steps of:
    adding a bandwidth below $f_{L1}$ for use by a forward transmit light beam in another PON; and
    adding a bandwidth below $f_{L2}$ for use by a return receive light beam in the other PON.

4. A method as recited in claim 1 wherein the filtering step is accomplished using a band pass filter.

5. A method as recited in claim 1 wherein the tuning step is accomplished using at least one tuner.

6. A method as recited in claim 5 wherein the tuning step sends each modulated carrier frequency to an addressed premise.

7. A method as recited in claim 1 wherein the modulating step is accomplished using frequency modulation techniques.

8. A method as recited in claim 1 wherein the modulating step is accomplished using amplitude modulation techniques.

9. A method as recited in claim 1 wherein the modulating step is accomplished using phase modulation techniques.

10. A Passive Optical Network (PON) using sub-octave techniques for the transmission of digital signals which comprises:
    a transmit modem for modulating a plurality of digital signals onto a respective RF carrier frequency (f), and for converting each modulated carrier frequency into an optical signal for combination with other optical signals to create a light beam, wherein the transmit modem transmits a forward transmit light beam in a first octave bounded by a low carrier frequency ($f_{L1}$) and a high carrier frequency ($f_{H1}$), wherein $2f_{L1} \geq f_{H1} > f_{L1}$, and wherein each optical signal in the light beam has a wavelength ($\lambda$);
    a transmitter for transmitting the light beam;
    an optical fiber having a first end for receiving the light beam from the transmitter and for transferring the light beam therethrough to a second end thereof;
    a splitter connected to the second end of the optical fiber for splitting the light beam into subsets;
    a plurality of optical receivers, wherein each optical receiver reconverts a respective subset of the light beam into the modulated carrier frequency;
    a band pass filter for filtering second order distortions outside the sub-octave from the modulated carrier frequency;
    a tuner for tuning to a selected carrier frequency and for directing the selected carrier frequency to an addressed premise; and
    a receive modem for receiving a return receive light beam in a second octave bounded by a low carrier frequency ($f_{L2}$) and a high carrier frequency ($f_{H2}$), wherein $2f_{L2} \geq f_{H2} > f_{L2}$, and for demodulating the tuned carrier frequency for receipt of its respective digital signal.

11. A network as recited in claim 10 wherein the forward transmit light beam and the return receive light beam include carrier frequencies in a range between 750 MHz and 40 GHz.

12. A network as recited in claim 10 further comprising the steps of:
    adding a bandwidth below $f_{L1}$ for use by a forward transmit light beam in another PON; and
    adding a bandwidth below $f_{L2}$ for use by a return receive light beam in the other PON.

13. A network as recited in claim 10 wherein the transmit modem modulates the digital signal with a technique selected from a group consisting of amplitude modulation, frequency modulation and phase modulation.

14. A method for enabling a sub-octave transmission of a digital signal over a passive optical network (PON) which comprises the steps of:
   identifying a first octave bounded by a low carrier frequency ($f_{L1}$) and a high carrier frequency ($f_{H1}$) for use by a forward transmit light beam, wherein $2f_{L1} \geq f_{F1} > f_{L1}$;
   identifying a second octave bounded by a low carrier frequency ($f_{L2}$) and a high carrier frequency ($f_{H2}$), for use by a return receive light beam, wherein $2f_{L2} \geq f_{H2} > f_{L2}$;
   retrieving the return receive light beam from a fiber optic cable, wherein the light beam includes a plurality of optical signals, and each optical signal corresponds to a modulated carrier frequency, and wherein the modulated carrier frequency is modulated with a digital signal;
   splitting the light beam into subsets;
   directing each subset of the light beam to a designated optical receiver;
   converting each light signal in the light beam to the corresponding modulated carrier frequency;
   filtering second order distortions outside the sub-octave from the modulated carrier frequency;
   tuning a selected modulated carrier frequency; and
   demodulating the tuned carrier frequency for receipt of its respective digital signal.

15. A method as recited in claim 14 wherein the forward transmit light beam and the return receive light beam include carrier frequencies in a range between 750 MHz and 40 GHz.

16. A method as recited in claim 14 further comprising the steps of:
   adding a bandwidth below $f_{L1}$ for use by a forward transmit light beam in another PON; and
   adding a bandwidth below $f_{L2}$ for use by a return receive light beam in the other PON.

\* \* \* \* \*